(12) United States Patent
Liu (10) Patent No.: US 9,069,420 B2
(45) Date of Patent: Jun. 30, 2015

(54) TOUCH DEVICE FOR DETERMINING REAL COORDINATES OF MULTIPLE TOUCH POINTS AND METHOD THEREOF

(75) Inventor: Yong Liu, Singapore (SG)

(73) Assignee: TPK Touch Solutions (Xiamen) Inc., Xiamen (CN)

( * ) Notice: Subject to any disclaimer, the term of this patent is extended or adjusted under 35 U.S.C. 154(b) by 440 days.

(21) Appl. No.: 13/176,749

(22) Filed: Jul. 6, 2011

(65) Prior Publication Data

US 2012/0120006 A1    May 17, 2012

(30) Foreign Application Priority Data

Nov. 13, 2010    (CN) .......................... 2010 1 0550974

(51) Int. Cl.
*G06F 3/041*    (2006.01)
*G06F 3/044*    (2006.01)

(52) U.S. Cl.
CPC ...... *G06F 3/044* (2013.01); *G06F 2203/04104* (2013.01)

(58) Field of Classification Search
USPC ...................... 345/173–179; 178/18.01–18.04
See application file for complete search history.

(56) References Cited

U.S. PATENT DOCUMENTS

| 5,869,791 A | 2/1999 | Young |
| 7,663,607 B2 * | 2/2010 | Hotelling et al. ............. 345/173 |
| 2008/0087477 A1 | 4/2008 | Cho et al. |
| 2010/0134422 A1 * | 6/2010 | Borras .......................... 345/173 |
| 2010/0141603 A1 * | 6/2010 | Hotelling ...................... 345/173 |

FOREIGN PATENT DOCUMENTS

CN    1705974    8/2003

* cited by examiner

*Primary Examiner* — Andrew Sasinowski
(74) *Attorney, Agent, or Firm* — Gokalp Bayramoglu (57) ABSTRACT

A touch device for determining real coordinates of multiple touch points is provided. The touch device for determining real coordinates of the multiple touch points comprises a plurality of electrodes and a scanning circuit having a Normal Scanning Circuit and a Split Scanning Circuit connected to said electrodes for eliminating ghost coordinates of the multiple touch points from raw coordinates to output the real coordinates of the multiple touch points. The method of determining real coordinates of multiple touch points on the touch device is also provided.

9 Claims, 9 Drawing Sheets

TOUCH DEVICE FOR DETERMINING REAL COORDINATES OF MULTIPLE TOUCH POINTS AND METHOD THEREOF

BACKGROUND OF THE INVENTION

This application claims the benefit of People's Republic of China Application No. 201010550974.9, filed on Nov. 13, 2010.

FIELD OF THE INVENTION

The present invention relates to a touch device for determining real coordinates of multiple touch points and a method thereof.

DESCRIPTION OF THE RELATED ART

In the last two decades, touch technologies have been applied in a variety of consumer applications such as touch screens in automated-teller machines (ATMs), track pads in laptop computers, and scroll wheels in media players. In these consumer applications, movement of an object such as a finger or a stylus along a surface of a touch device is detected by a touch sensor inside of the touch device, wherein the touch sensor generates electrical signals for subsequent processing.

There are many types of touch sensing methods such as resistive sensing, capacitive sensing, acoustic wave sensing, and optical sensing. In the capacitive sensing method, a touch sensor perceives touch locations by detecting change in capacitance due to proximity of a conductive object such as a metal or a part of human body. Capacitive touch sensors are classified as projective capacitive type and surface capacitive type. A projective capacitive type touch sensor contains a lattice electrode pattern whereas a surface capacitive touch sensor includes electrodes formed on peripheral edges of a continuous conductive sheet.

Figure 1A:
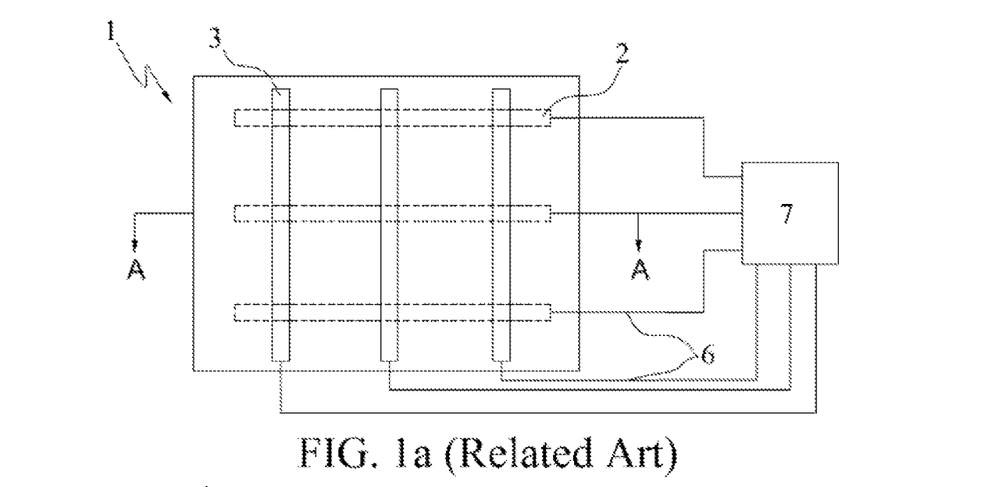
FIG. 1a is a schematic top view of a conventional projective capacitive touch device.
Figure 1B:
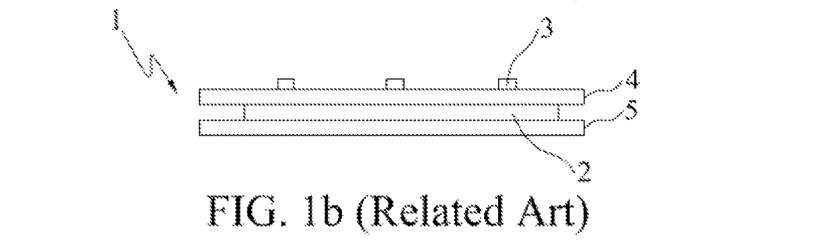

FIG. 1a and FIG. 1b show a conventional projective capacitive touch device 1 comprising a plurality of first electrodes 2 in a first direction, a plurality of second electrodes 3 in a second direction, an insulator 4, a substrate 5, wires 6, and a processor 7. The plurality of first electrodes 2 and the plurality of second electrodes 3 intersect each other to form a lattice pattern placed on the substrate 5. Insulator 4 is arranged between the plurality of first electrodes 2 and the plurality of second electrodes 3. Processor 7 is connected to the plurality of first electrodes 2 and the plurality of second electrodes 3 by wires 6. When a conductive object such as a finger or a stylus touches or moves on the surface of the projective capacitive touch device 1, change in self capacitance produced on both first electrodes 2 in the first direction and second electrodes 3 in the second direction can be transmitted and then processed by the processor 7. Centroids of the change in self capacitance indicate locations of the touch point in the first direction and in the second direction. Coordinate of the touch point is calculated by intersecting the centroids in the first direction and the second direction. In other words, the conventional method of detecting touch point comprises: (a) scanning both the first electrodes 2 in the first direction and the second electrodes 3 in the second direction; (b) computing centroids of the change in self capacitance in the first direction and the second direction; and (c) calculating the coordinate of the touch point based on the centroids.

Figure 2:
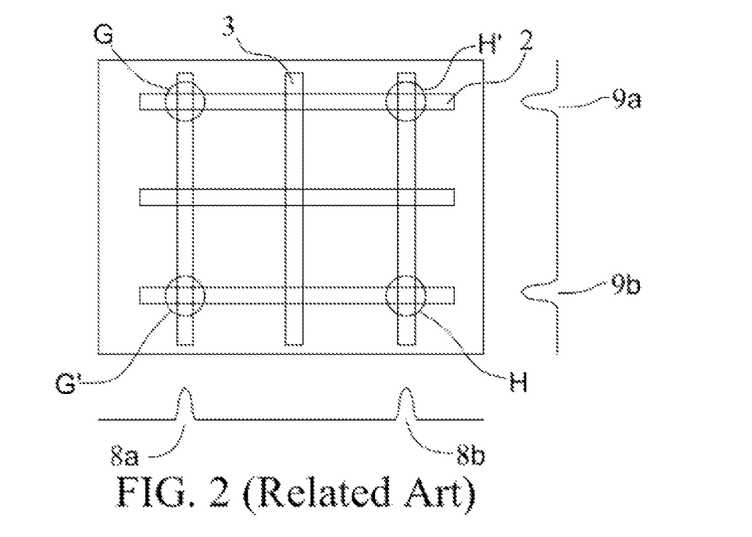
FIG. 2 is a schematic view of two touch points appearing on the conventional projective capacitive touch device of FIG. 1a and FIG. 1b.

FIG. 2 shows that when two touch points G and H appear on surface of the projective capacitive touch device 1, two centroids 8a, 8b are computed on the first electrodes 2 and two centroids 9a, 9b are computed on the second electrodes 3. Thus, four raw coordinates G (8a, 9a), G' (8a, 9b), H' (8b, 9a), H (8b, 9b) are formed. However, in these four raw coordinates, only two are real coordinates indicating the two touch points G, H, and the other two are defined as "ghost coordinates", which are coordinates of so-called "ghost points".

As a result, conventional projective capacitive touch devices have appearance of ghost coordinates, which limit the application and operation of the touch device for determining multiple touch points. Therefore, it is necessary to eliminate ghost coordinates during the process of determining multiple touch points located on a touch device as mentioned above.

SUMMARY OF THE INVENTION

It. is an object of the present invention to provide a touch device for determining multiple touch points, wherein the touch device eliminates ghost coordinates from raw coordinates of the multiple touch points to determine real coordinates.

The present disclosure relates to a touch device for determining real coordinates of multiple touch points comprises a plurality of electrodes and a scanning circuit, wherein the scanning circuit further comprises of a Normal Scanning Circuit and a Split Scanning Circuit connected to the plurality of electrodes. Normal Scanning Circuit is a circuit for scanning the electrodes for detecting taw coordinates of multiple touch points (herein referred to as "Normal Scanning Circuit"). Split Scanning Circuit is a circuit for scanning electrode parts, wherein the electrodes are divided into two separate parts. The first part comprises of first A electrodes and first B electrodes, and the second part comprises of second A electrodes and second B electrodes. The split scanning circuit, after scanning, eliminates ghost coordinates of the multiple touch points from the raw coordinates of multiple touch points to determine real coordinates of the multiple touch points (herein referred to as the "Split Scanning Circuit").

It is another object of the present invention to provide a method of determining real coordinates of multiple touch points.

The present disclosure further relates to a method of determining real coordinates of multiple touch points, wherein the method comprises: (a) scanning a plurality of electrodes both in a first direction and a second direction to detect raw coordinates of said multiple touch points by a Normal Scanning Circuit; and (b) scanning said electrodes to determine real coordinates of said touch points in said raw coordinates by a Split Scanning Circuit.

By means of the present invention, a touch device can eliminate ghost coordinates and output only real coordinates during the process of determining multiple touch points thus overcoming the disadvantage of those conventional touch devices.

BRIEF DESCRIPTION OF THE DRAWINGS

The skilled artisan will understand that the drawings, described below, are for illustration purposes only. The drawings are not intended to limit, the scope of the present teachings in any way. Like reference numerals designate corresponding parts throughout the several views.

FIG. 1b is a schematic sectional view taken along the line A-A of FIG. 1a;

FIG. 3b is a schematic sectional view of the touch device of FIG. 3a;

FIG. 4b is a schematic sectional view of the touch device of FIG. 4a;

DETAILED DESCRIPTION OF THE EMBODIMENTS

Figure 3A:
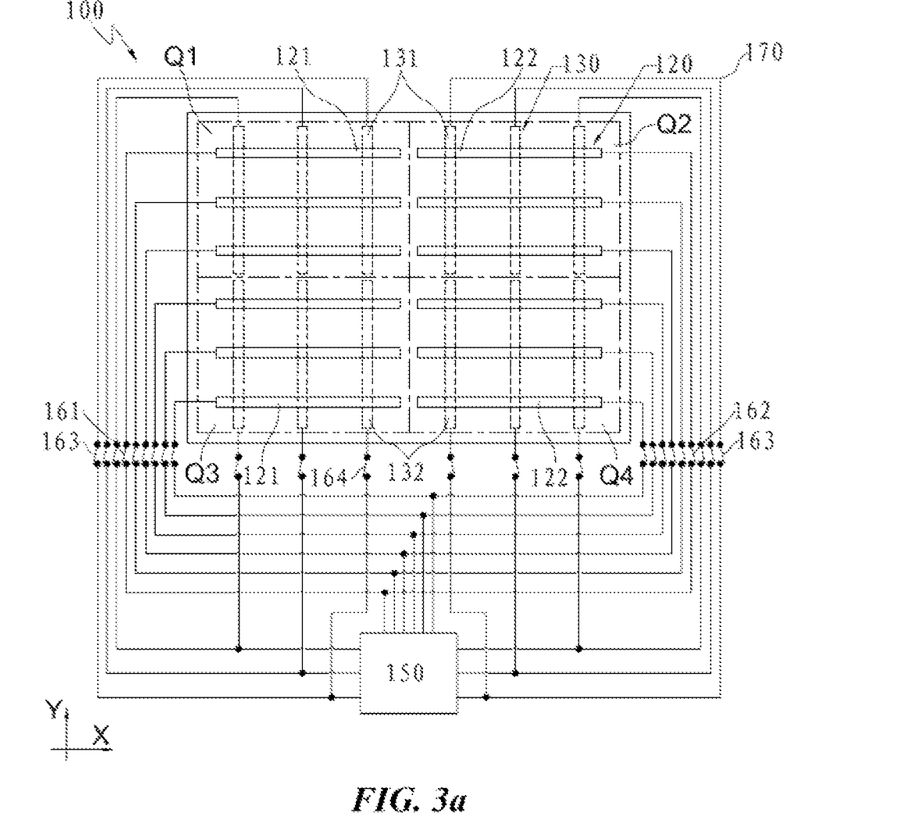
FIG. 3a is a schematic circuit diagram of the touch device according to the first embodiment of the present invention.
Figure 3B:
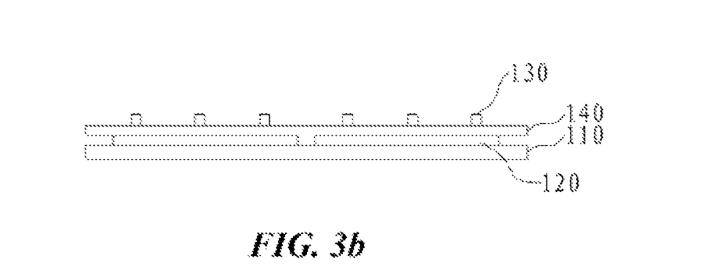

FIGS. 3a and 3b show a touch device 100 for determining real coordinates of multiple touch points in accordance with a first embodiment of the present invention. The touch device 100 comprises a substrate 110, a plurality of first electrodes 120 disposed in the first direction X, a plurality of second electrodes 130 disposed in the second direction Y, an insulating layer 140, a processor 150, wires 170 and switches 161, 162, 163, 164. The first electrodes 120 are placed on the substrate 110. The first direction is different from the second direction. The first electrodes 120 and the second electrodes 130 disposed on the two opposite sides of the insulating layer 140 are intersected with each other to form a plurality of intersection points. In an embodiment, the insulating layer 140 is of the shape of a plate and provides insulation between the first electrodes 120 and the second electrodes 130. Moreover, each of the first electrodes 120 comprises a plurality of divided electrodes and each of the second electrodes comprises a plurality of divided electrodes. Preferably, each first electrode 120 is divided into two separate electrode parts in the first direction X, right and left, a first A electrode 121 and a first B electrode 122, while each second electrode 130 is divided into two separate electrode parts in the second direction Y, upper and lower, a second A electrode 131 and a second B electrode 132. Therefore, the first A electrode 121 intersect with the second A electrode 131 to form a first electrode area Q1. In the same way, the first B electrode 122 intersect with the second. A electrode 131 to form a first electrode area Q2; the first A electrode 121 intersect with the second B electrode 132 to form a first electrode area Q3; the first B electrode 122 intersect with the second B electrodes 132 to form a first electrode area Q4. The first A electrodes 121 are connected to the processor 150 with switches 161. In the same way, the first B electrodes 122 are connected to the processor 150 with switches 162; the second A. electrodes 131 are connected to the processor 150 with switches 163; the second B electrodes 132 are connected to the processor 150 with switches 164. The touch device 100 further comprises a scanning circuit (not shown) having a Normal Scanning Circuit and a Split. Scanning Circuit. These two different scanning circuits are both utilized to scan the first electrodes 120 and the second electrodes 130, when multiple touch points occur on the touch device 100.

In an embodiment, switches 161, 162, 163, 164 are controlled by a scanning circuit. When all switches 161, 162, 163, 164 are closed to transmit scanning signals to electrodes, scanning signals are transmitted to both first A electrodes 121 and first B electrodes 122 resulting in electrodes 121 and 122 together performing as a whole structure i.e the first electrodes 120 perform. Similarly, scanning signals are transmitted to both the second A electrodes 1131 and the second B electrodes 132, resulting in electrodes 131 and 132 together performing as the whole structure i.e the second electrodes 130 perform. At this time, the Normal Scanning Circuit starts to scan the first electrodes 120 and the second electrodes 130.

In an embodiment, when switches 161 connected to first A electrodes 121 are closed and other switches 162, 163, 164 are open, Split Scanning Circuit starts to scan the first A electrodes 121. Similarly, when switches 162 connected to first B electrodes 122 are closed and other switches 161, 163, 164 are open, Split Scanning Circuit starts to scan the first B electrodes 122. When switches 163 connected to second A electrodes 131 are closed and other switches 161, 162, 164 are open, Split Scanning Circuit starts to scan the second A electrodes 131. When switches 164 connected to second B electrodes 132 are closed and other switches 161, 162, 163 are open, Split Scanning Circuit starts to scan the second B electrodes 132.

To fulfill various design requirements, configuration of the first. A electrodes 121, the first B electrodes 122, the second A electrodes 131, and the second B electrodes 132 have different forms. For instance, the first A electrodes 121 are symmetrical to the first B electrodes 122, while the second A electrodes 131 are symmetrical to the second B electrodes 132, making the four electrode areas Q1, Q2, Q3, Q4 symmetrical to each other. In another instance, the first A electrodes 121 are not symmetrical to the. first B electrodes 122 and the second A electrodes 131 are not symmetrical to the second B electrodes 132, making the four electrode areas Q1, Q2, Q3, Q4 non-symmetrical to each other.

Figure 4A:
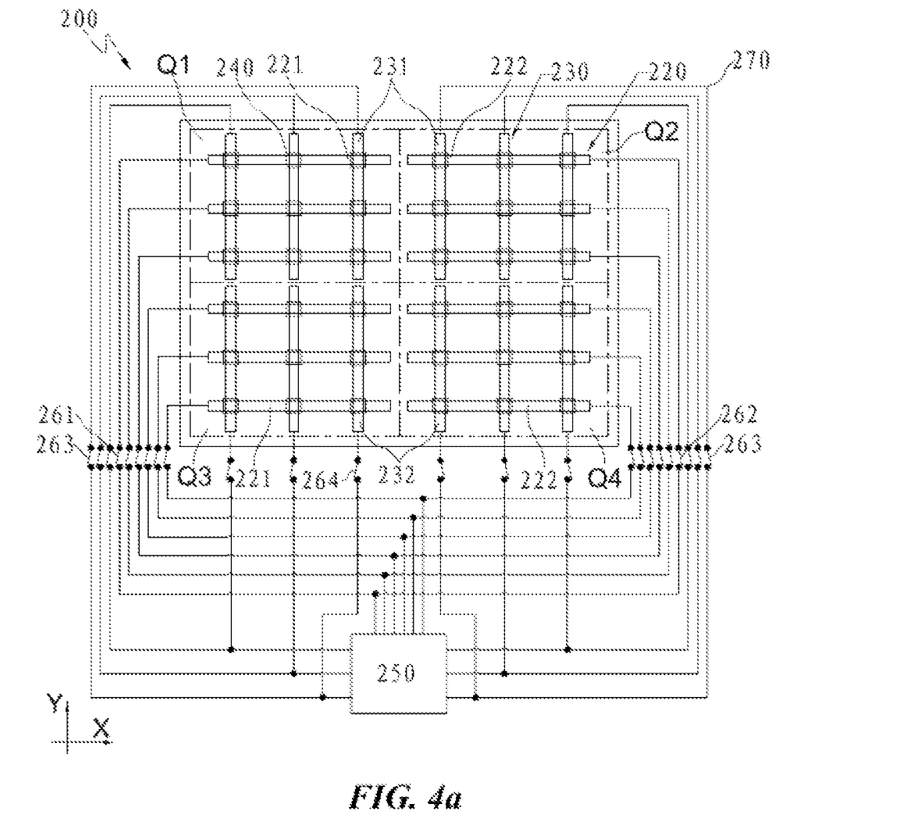
FIG. 4a is a schematic circuit diagram of the touch device according to the second embodiment of the present invention.
Figure 4B:
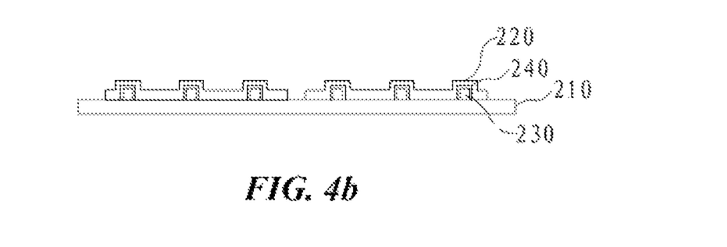

FIGS. 4a and 4b illustrate a touch device 200 for determining real coordinates of multiple touch points in accordance with a second embodiment of the present invention. Similar to touch device 100 and in the accordance with the first embodiment of the present invention, the touch device 200 comprises a substrate 210, a plurality of first electrodes 220 disposed in the first direction X, a plurality of second electrodes 230 disposed in the second direction Y, a plurality of insulating elements 240, a processor 250, wires 270 and switches 261, 262, 263, 264. The difference is that the first electrodes 220 and the second electrodes 230 are both placed on the substrate 210. To insulate the first electrodes 220 from the second electrodes 230, the insulating elements 240 are located between the first electrodes 220 and the second electrodes 230 at the intersection points of the two electrodes. In addition, each first electrode 220 is divided into two separate electrode parts, a first A electrode 221 and a first B electrode 222, in the first direction X, while each second electrode 230 is divided into two separate electrode parts, a second A electrode 231 and a second B electrode 232, in the second direction Y. The other components of the touch device 200 according to the second embodiment of the present invention are the same as those of the touch device 100 mentioned above.

The shape of the first electrodes and the second electrodes could be of any geometry contour or combination of different geometry contours such as stripe, polygon and so on.

In an embodiment, of the first electrodes and the second electrodes, there are at least two electrodes in each of the two directions in the present invention. Resolution and size of the proposed touch device are main factors influencing the number of electrodes. Usually, a higher resolution or larger size requires more electrodes.

Being applied in various devices, touch device of the present invention may be opaque such as in touch pads of a laptop computer or may be transparent such as in touch screen of a cell phone. In an embodiment, first and second electrodes are made of conductive material while the insulating layer and the insulating elements are made of insulating material. Opaque conductive material can be selected from copper, alumina, gold and other metals, while the transparent conductive material could be Indium Tin Oxides (ITO), Aluminum-doped zinc Oxide, transparent conductive oxides and so on. The insulating material could be plastic, glass and so on.

Figure 5:
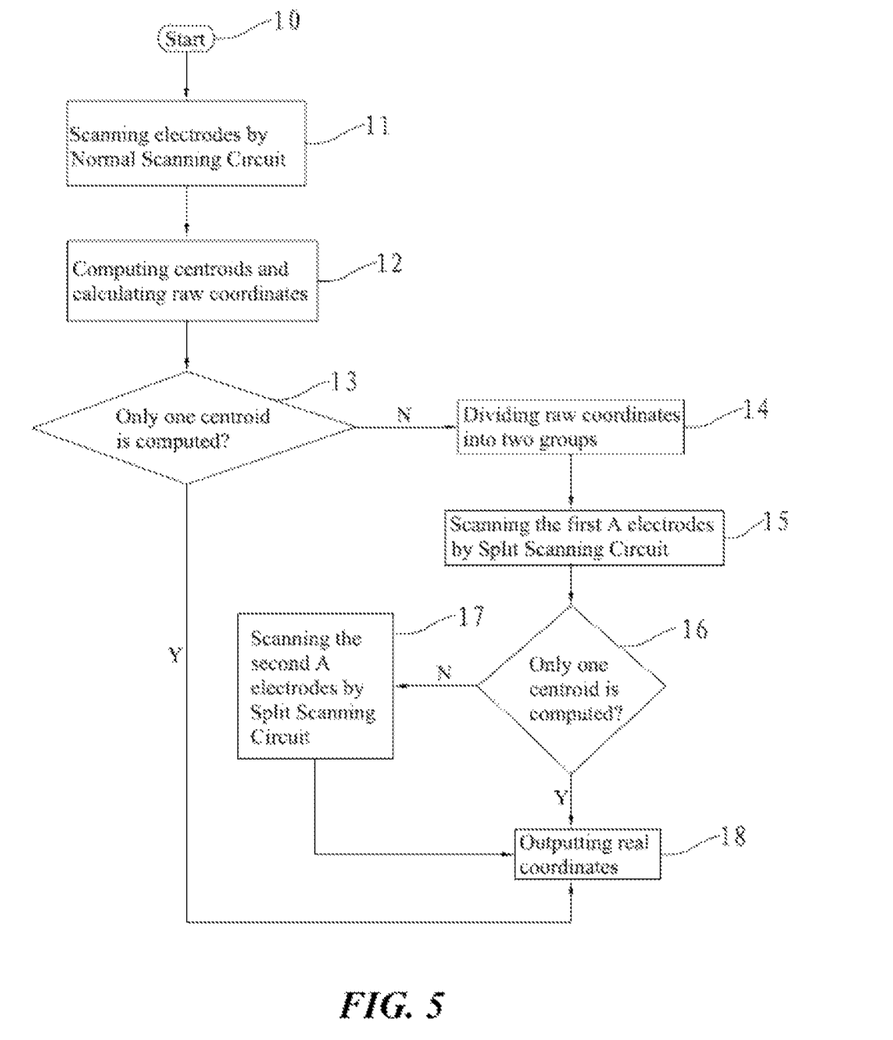
FIG. 5 is a flow chart showing a method of determining real coordinates of multiple touch points according to the first embodiment of the present invention.
Figure 6A:
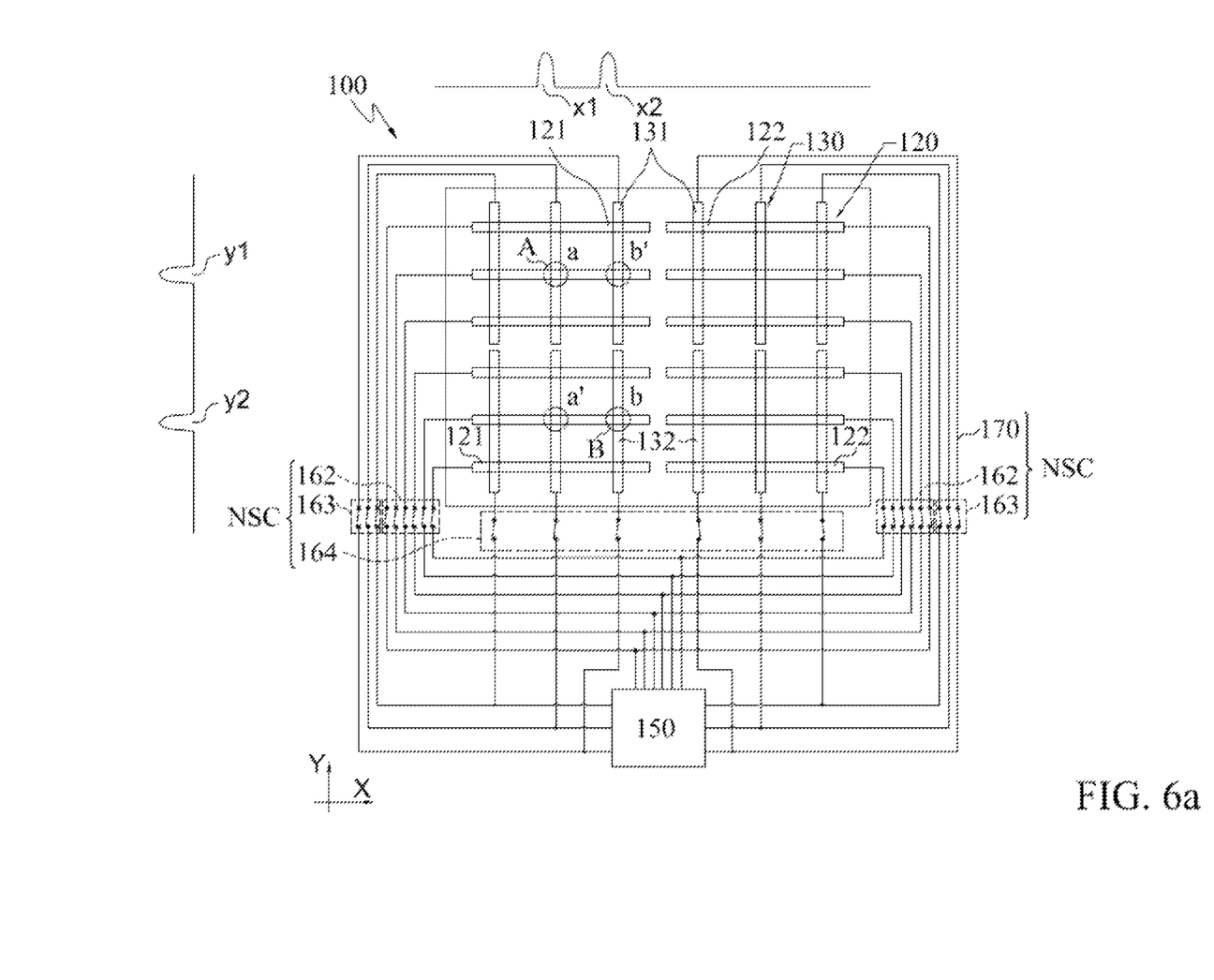
FIGS. 6a-6c are schematic views of two touch points occurring in two neighboring electrode areas.

When at least two touch points appear on surface of a touch device for determining real coordinates of multiple touch points, the real coordinates of the touch points can be determined by using the method of determining real coordinates of multiple touch points shown in FIG. 5. A situation of two touch points appearing on a surface of a projective capacitive touch device is taken as an example, referring to FIGS. 6a-6c. The process starts at step 10 where the touch device is in standby. When two touch points, A and B, occur in two neighboring electrode areas on the surface of the touch device, the process proceeds to step 11.

In step 11, all switches are closed and then the processor respectively applies a scanning signal to the first electrodes and the second electrodes through wires. Normal Scanning Circuit scans the first electrodes in the first direction X and the second electrodes in the second direction Y. The signals representing the changes in the self-capacitance in both the first direction X and the second direction Y caused by two touch points A and B are transmitted to the processor (not shown).

Step 12 is implemented, in which centroids $x1$, $x2$, representing changes in self capacitance, corresponding to two touch points A, B in the first direction X and the centroids $y1$, $y2$, representing changes in self capacitance, corresponding to two touch points A, B in the second direction Y are computed by the processor based on the signals representing the changes in the self-capacitance created in step 11. According to location and definition of the second A electrodes 131 and the second B electrodes 132, the processor can determine that the centroid $y1$ is on the second A electrodes 131 and the centroid $y2$ is on the second B electrodes 132. By intersecting the centroids $x1$, $x2$, $y1$, $y2$, four raw coordinates $a(x1,y1)$, $b(x2,y2)$, $a'(x1,y2)$ and $b'(x2,y1)$ are calculated, referring to FIG. 6a.

In step 13, it is determined whether only one centroid is computed in either the first direction X or the second direction Y in step 13. If two centroids are computed in both the first direction X and the second direction Y, which presents that $x1$ is not equal to $x2$ and $y1$ is not equal to $y2$, the process proceeds to step 14, in which the processor defines two diagonal coordinates of those four raw coordinates as belonging to one group, leading to two groups of raw coordinates, i.e. $a(x1,y1)$, $b(x2,y2)$ in one group and $a'(x1,y2)$, $b'(x2,y1)$ in another group. As ghost coordinates exist, raw coordinates in one of the two groups are real coordinates, while the raw coordinates in the other group are ghost coordinates.

Figure 6B:
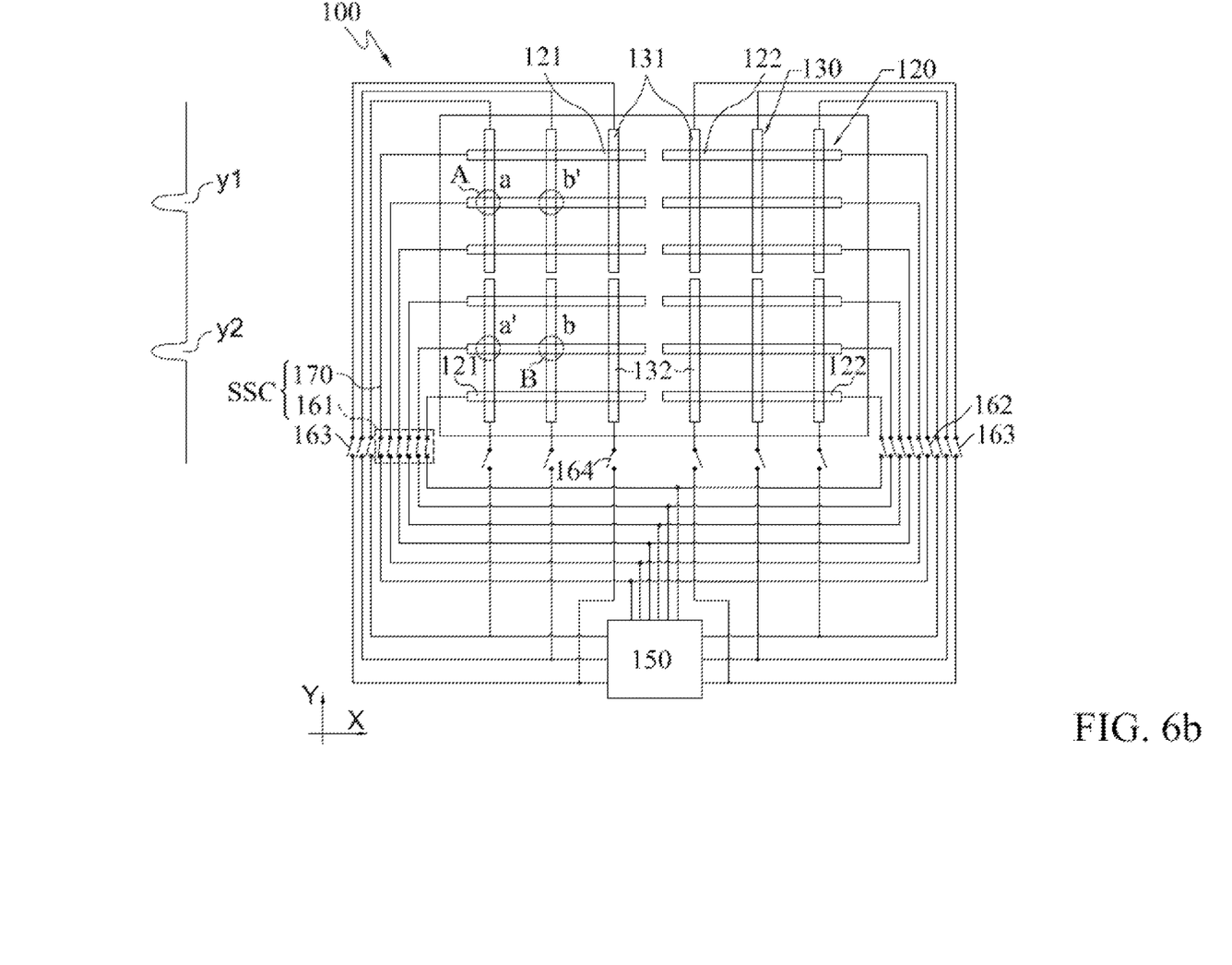

In step 15, only the switches connected to the first A electrodes 121 are closed while other switches are open and then the processor transmits the scanning signal to the first A electrodes 121 through wires. Split Scanning Circuit scans the first A electrodes 121. Signals representing changes in self capacitance caused by touch points are transmitted to the processor, as illustrated in FIG. 6b. The processor computes the centroids of changes in self capacitance based on the signals transmitted to the processor.

In step 16, it is determined whether there is the only one centroid computed in step 15. If there are two centroids in step 15, the process proceeds to step 17.

Figure 6C:
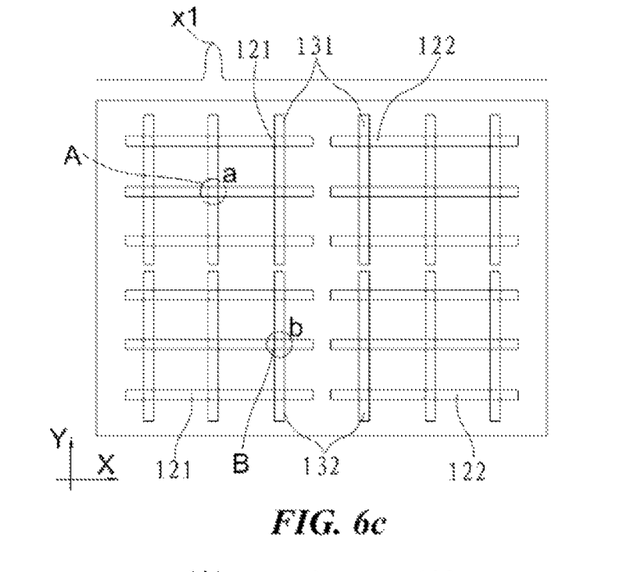

In step 17, only the switches connected to the second A electrodes 131 are closed while other switches are open and then the processor transmits the scanning signal to the second A electrodes 131 through wires. Split Scanning Circuit scans the second A electrodes 131. Signals representing changes in self capacitance caused by touch points are transmitted to the processor, as illustrated in FIG. 6c. The processor computes the centroids of changes in self capacitance based on the signals transmitted to the processor.

After step 17, only one centroid $xl$ is computed. Moreover, only centroid $y1$ computed in step 12 is on the second A electrodes 131. Thus, the raw coordinates $a(x1, y1)$ are the real coordinates and are in the same group as their diagonal coordinates $b(x2, y2)$. Therefore the group of raw coordinates $a(x1,y1)$ and $b(x2,y2)$ in step 14 are the real coordinates of two touch points A and B. The processor outputs the real coordinates $a(x1, y1)$ and $b(x2, y2)$ in step 18.

Figure 7A:
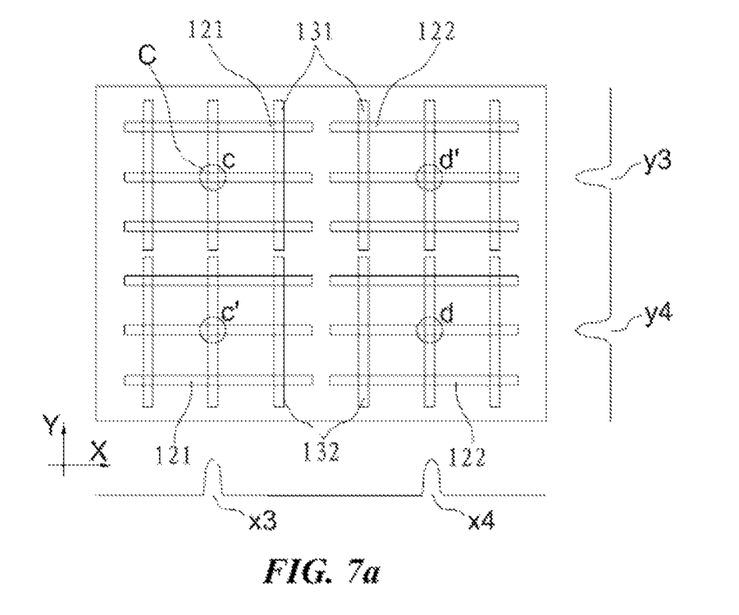
FIGS. 7a-7b are schematic views of two touch points occurring in two diagonal electrode areas.
Figure 7B:
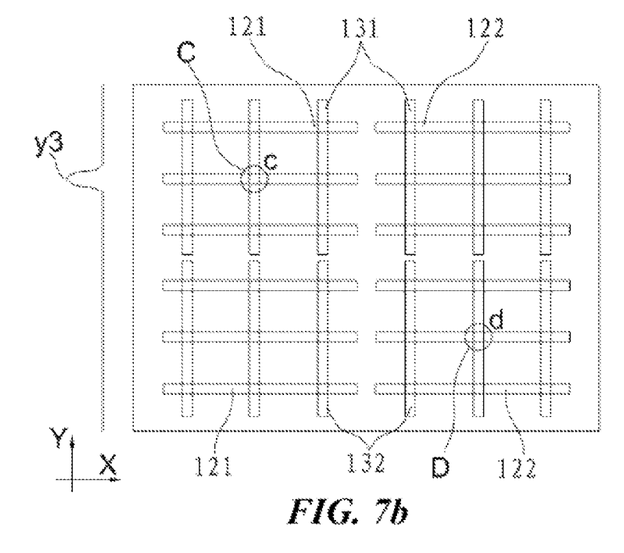

FIGS. 7a and 7b show that two touch points C and D occur in two diagonal electrode areas. In step 12, according to location and definition of the first A electrodes 121 and the first B electrodes 122, processor can determine that the centroid $x3$ is on the first A electrodes 121 and the centroid $x4$ is on the first B electrodes 122. In this situation, the result of step 16 is that only one centroid $y3$ is computed in step 15. Thus, in the two groups of raw coordinates $c(x3,y3)$, $d(x4,y4)$, $c'(x3,y4)$, and $d'(x4,y3)$, the group of raw coordinates $c(x3, y3)$ and $d(x4,y4)$ containing the real coordinate $c(x3,y3)$ are the real coordinates of two touch points C and D. After step 16, the process directly proceeds to step 18, in which the processer outputs the real coordinates $c(x3,y3)$ and $d(x4,y4)$.

Figure 8:
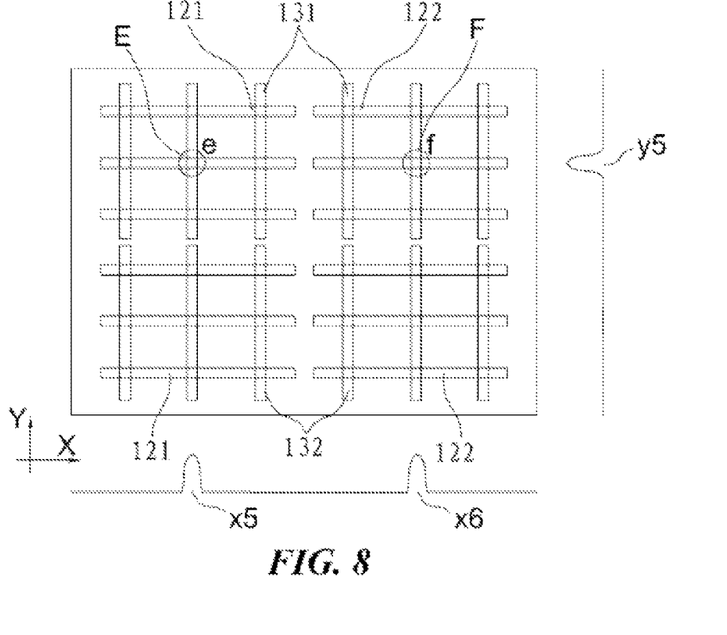
FIG. 8 is a schematic view of two touch points occurring on the same electrode.

FIG. 8 illustrates that two touch points E and F occur on the same electrode. In this situation, the determined result in step 13 of the process in FIG. 5 is that only one centroid $y5$ is computed, which presents that only two raw coordinates $e(x5, y5)$ and $f(x6,y6)$ are calculated in step 12. Thus, these two raw coordinates are the real coordinates of two touch points E and F. After step 13, the process directly proceeds to step 18, in which the processor outputs the real coordinates $e(x5, y5)$ and $f(x6, y6)$.

Real coordinates of multiple touch points can be output to a control device or display for subsequent executions, which are not limited in the present invention.

By various designs of scanning circuit, Split Scanning Circuit may, each time, scan any of the first or second electrodes with switches connected to the scanned electrodes being closed and switches connected to the other electrodes being open. If more than one centroid is computed, the Split Scanning Circuit may repeat the process by scanning other electrodes of a different direction. For example, in step 15, switches connected to the first B electrodes are closed, and the Split Scanning Circuit scans the first B electrodes while the other electrodes are open. if two centroids are computed, in step 17, switches connected to the second B electrodes are closed, and the Split Scanning Circuit scans the second B electrodes while the other electrodes are open.

Figure 9:
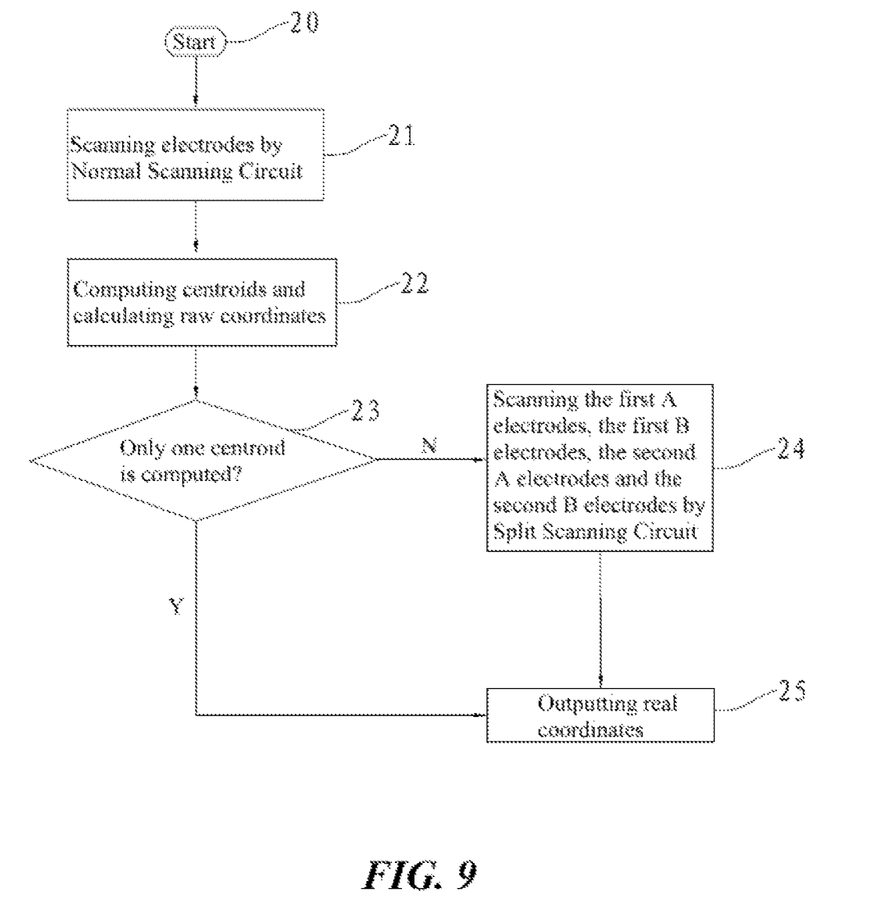
FIG. 9 is a flow chart showing a method of determining real coordinates of multiple touch points according to the second embodiment of the present invention.

Real coordinates of multiple touch points can also be determined by using the method explained in FIG. 9. Similar to the method presented in FIG. 5, the process from step 20 to step 23 is the same as that from step 10 to step 13. Nevertheless, when two centroids are computed in both the first direction X and the second direction Y, the processor does not divide raw coordinates, but instead, as in step 24, the Split Scanning Circuit scans all electrodes namely the first A electrodes, the first B electrodes, the second A electrodes and the second B electrodes, in any order, with the switches, connected to the electrodes being scanned, being closed while other switches are open, to find out the real coordinates directly. After step 24, the processor outputs the real coordinates in step 25.

The processor mentioned above comprises a scanning unit, a computing unit and an outputting unit. The scanning unit is used to provide scanning signal to electrodes and receive electric signal (such as a signal representing the change in the self capacitance) generated during scanning of the electrodes. The computing unit performs the role of computing centroid and calculating projection. The results, such as the real coordinates of the touch points, are outputted by the outputting unit.

Method of determining real coordinates of two touch points mentioned above can also be utilized to determine real coordinates of more than two touch points. The Normal Scanning Circuit scans a plurality of electrodes both in a first direction and a second direction to detect raw coordinates of said touch points, and then the Split Scanning Circuit scans said electrodes to determine real coordinates of said touch points from said raw coordinates.

One of multiple touch points described above is located on at least one intersection of the first electrodes and second electrodes.

While certain embodiments have been shown and described, various modifications and substitutions may be made thereto without departing from the spirit and scope of the invention. Therefore, it is to be understood that the present invention has been described by way of illustration and not limitations.

What is claimed is:

1. A method of determining real coordinates of multiple touch points, comprising the steps of:
    (a) scanning a plurality of electrodes both in a first direction and a second direction to detect raw coordinates of said touch points by a Normal Scanning Circuit, and computing centroids of changes in self capacitance corresponding to said multiple touch points in said first direction and said second direction and calculating raw coordinates of said touch points by intersecting said centroids; and
    (b) scanning said plurality of electrodes to determine real coordinates of said multiple touch points from said raw coordinates by a Split Scanning Circuit, and dividing said raw coordinates into two groups when at least two said centroids are computed both in said first direction and said second direction, wherein said step (b) further comprises steps of:
        (b1) scanning a plurality of first A electrodes by said Split Scanning Circuit to compute centroids of changes in self capacitance on said first A electrodes;
        (b2) scanning a plurality of second A electrodes by said Split Scanning Circuit to compute centroids of changes in self capacitance on said second A electrodes when at least two said centroids are computed in said step (b1); and
        (b3) outputting said group of raw coordinates having said centroid in said step (b2) as real coordinates of said touch points.

2. The method of claim 1, wherein said step (b1) comprises scanning a plurality of first B electrodes by said Split Scanning Circuit to compute centroids of changes in self capacitance on said first B electrodes.

3. The method of claim 1, wherein said step (b2) comprises scanning a plurality of second B electrodes by said Split Scanning Circuit to compute centroids of changes in self capacitance on said second B electrodes.

4. The method of claim 1, further comprising the steps of:
    (c) outputting said raw coordinates as real coordinates of said multiple touch points when only one said centroid is computed in either said first direction or said second direction in said step (b).

5. A method of determining real coordinates of multiple touch points, comprising the steps of:
    (a) scanning a plurality of electrodes both in a first direction and a second direction to detect raw coordinates of said touch points by a Normal Scanning Circuit, and computing centroids of changes in self capacitance corresponding to said multiple touch points in said first direction and said second direction and calculating raw coordinates of said touch points by intersecting said centroids; and
    (b) scanning said plurality of electrodes to determine real coordinates of said multiple touch points from said raw coordinates by a Split Scanning Circuit, and dividing said raw coordinates into two groups when at least two said centroids are computed both in said first direction and said second direction, wherein said step (b) further comprises steps of:
        (b1) scanning a plurality of first A electrodes by said Split Scanning Circuit to compute centroids of changes in self capacitance on said first A electrodes; and
        (b2) outputting said group of raw coordinates having said centroid in said step (b1) as real coordinates of said multiple touch points when only one centroid is computed in said step (1).

6. The method of claim 5, wherein said step (b1) comprises scanning a plurality of first B electrodes by said Split Scanning Circuit to compute centroids of changes in self capacitance on said first B electrodes.

7. The method of claim 5, wherein said electrodes are connected with the Normal Scanning Circuit through switches and said switches are closed when said Normal Scanning Circuit scans said electrodes.

8. The method of claim 5, wherein said plurality of electrodes comprises a plurality of said first A electrodes and a plurality of first B electrodes in the first direction and a plurality of second A electrodes and a plurality of second B electrodes in the second direction, wherein a plurality of switches connect said first A electrodes, said first B electrodes, said second A electrodes. and said second B electrodes to a processor, wherein only switches connected to first A electrodes, or first B electrodes, or second A electrodes, or second B electrodes are closed while others are open when said Split Scanning Circuit scans the electrodes with switches closed.

9. The method of claim 5, further comprising the steps of:
    (c) outputting said raw coordinates as real coordinates of said multiple touch points when only one said centroid is computed in either said first direction or said second direction in said step (b).

* * * * *